UNITED STATES PATENT OFFICE.

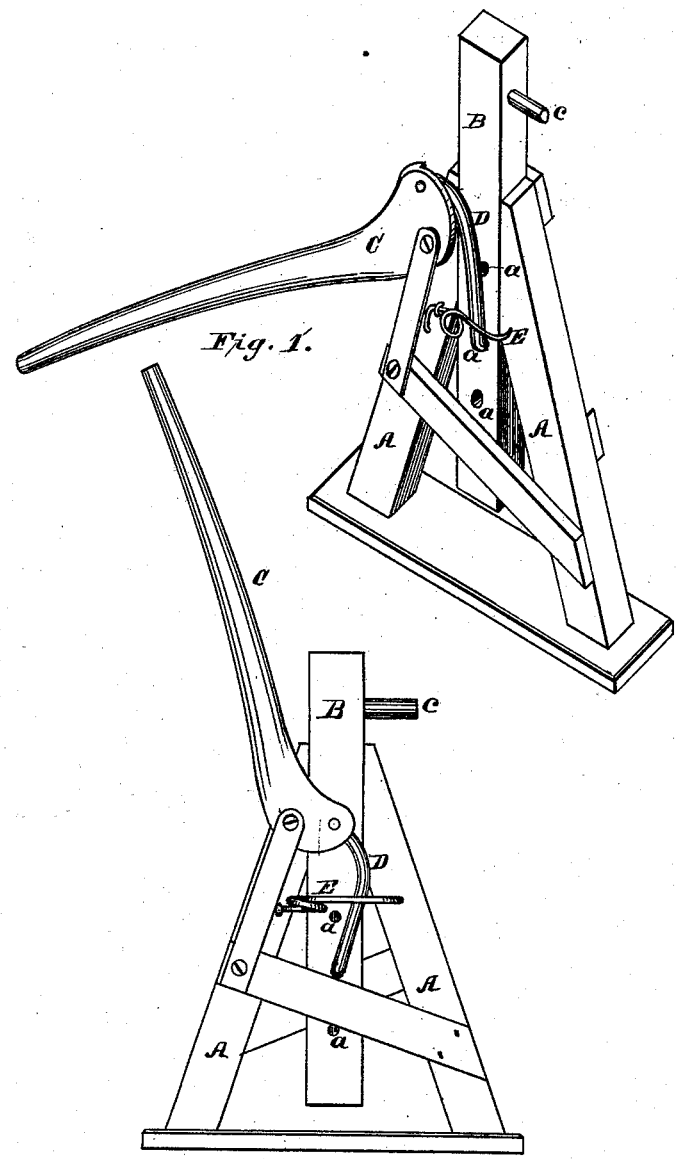

HIAL B. HART, OF AKRON, OHIO, ASSIGNOR TO HOPKINS & ROBINSON MANUFACTURING COMPANY, OF SAME PLACE.

IMPROVEMENT IN WAGON-JACKS.

Specification forming part of Letters Patent No. 219,089, dated September 2, 1879; application filed March 13, 1879.

*To all whom it may concern:*

Be it known that I, HIAL B. HART, of Akron, in the county of Summit and State of Ohio, have invented a new and useful Improvement in Wagon-Jacks, of which the following is a specification.

My invention relates to that class of wagon-jacks wherein the vehicle-axle is raised by a vertical bar sliding endwise in guides attached to a base or stand, and is operated by a lever pivoted to the stand and connected with the bar by a link.

Heretofore, in such jacks, the link has been connected with the bar above the point at which the lever is pivoted, and the bar is pushed up, as is shown in Patent to R. M. Reynolds, November 30, 1869, and W. Z. Black, July 17, 1877.

The objection to this arrangement is, that the link being connected near the top of the bar tends to cause the bar to sway to one side and bind in the guides, and also, when the connection is as hereinafter described, renders the link liable to become disconnected from the bar.

The object of my invention is to overcome these difficulties; and to that end it consists in pivoting the lever near the top of the stand, above the point of connection of the link and bar, and, in connection with a link of the form shown, a spring for holding the link from becoming disconnected from the bar.

In the accompanying drawings, Figure 1 is a perspective view of my improved wagon-jack with the bar raised; Fig. 2, a side elevation of the same with the bar down, and Fig. 3 a perspective view of the link.

The stand A consists of a base and two uprights, which latter are connected and braced by suitable cross-slats, and form guides for the sliding bar B. C is the hand-lever, pivoted near the top of the stand A upon a bolt passing through one of the uprights and an outer supporting-brace. D is the link, of the form shown in Fig. 3, consisting of a metallic bar bent at each end at a right angle to form journals, which enter holes in the bar and lever, respectively, and is prevented from escaping from the lever by the bar B, while a spring, E, attached to the stand A, holds it within one of the holes *a a a* in the bar B, but permits it to be changed from one to the other when desired.

By this arrangement the lever, instead of pushing, draws the bar upward, and the link being connected with the bar toward its lower end renders it less liable to sway sidewise and bind, while the link, being drawn instead of pushed, is less liable to slip out of the hole in the bar.

When the lever C is thrown down to raise the bar, the journal of the link D swings past the upper center above the pivot, and, the end of the lever resting on the ground, holds the bar up until the lever is again raised. A pin, *c*, near the top of the bar forms a shoulder to raise the forward axle of the vehicle when the top of the bar is adjusted for the rear axle.

I claim—

1. The herein-described lifting-jack, consisting of the stand A, bar B, lever C, link D, and spring E, all arranged and operating substantially as and for the purpose hereinbefore set forth.

2. In combination with the stand A, bar B, link D, and lever C, pivoted above the point of connection of the link and bar, the spring E, adapted to hold the link in a hole of the bar B, substantially as shown.

In testimony that I claim the foregoing I have hereunto set my hand this 6th day of March, A. D. 1879.

HIAL B. HART.

Witnesses:
C. P. HUMPHREY,
E. W. STUART.